United States Patent
Takeda et al.

(10) Patent No.: US 10,637,034 B2
(45) Date of Patent: Apr. 28, 2020

(54) BATTERY PACK

(71) Applicant: SANYO Electric Co., Ltd., Osaka (JP)

(72) Inventors: Kensaku Takeda, Tokushima (JP); Masaya Nakano, Hyogo (JP); Osamu Inaoka, Hyogo (JP); Hidemi Kurihara, Hyogo (JP); Haruhiko Yoneda, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 299 days.

(21) Appl. No.: 15/513,053

(22) PCT Filed: Sep. 14, 2015

(86) PCT No.: PCT/JP2015/004668
§ 371 (c)(1),
(2) Date: Mar. 21, 2017

(87) PCT Pub. No.: WO2016/059751
PCT Pub. Date: Apr. 21, 2016

(65) Prior Publication Data
US 2017/0301905 A1    Oct. 19, 2017

(30) Foreign Application Priority Data
Oct. 17, 2014    (JP) .................... 2014-212551

(51) Int. Cl.
*H01M 2/24* (2006.01)
*H01M 2/10* (2006.01)
(Continued)

(52) U.S. Cl.
CPC ........... *H01M 2/24* (2013.01); *H01M 2/0217* (2013.01); *H01M 2/0267* (2013.01);
(Continued)

(58) Field of Classification Search
None
See application file for complete search history.

(56) References Cited

U.S. PATENT DOCUMENTS 6,811,921 B2 * 11/2004 Dansui ................ H01M 2/105
429/100
2003/0013009 A1    1/2003 Dansui et al.
(Continued)

FOREIGN PATENT DOCUMENTS

FR    2 924 857       6/2009
JP    6-080260 U     11/1994
(Continued)

OTHER PUBLICATIONS

JP 2013-089560A Machine Translation, Retrieved Feb. 28, 2019 (Year: 2013).*
(Continued)

*Primary Examiner* — Amanda C. Walke
(74) *Attorney, Agent, or Firm* — Wenderoth, Lind & Ponack, L.L.P.

(57) ABSTRACT

Battery pack includes: a plurality of chargeable/dischargeable cylindrical cells; battery holder in which the plurality of cylindrical cells are disposed; and thermally conductive resin that closely adheres to cylindrical cells, which are stored in battery holder, in a thermally coupled state above battery holder. Battery holder includes: bottom plate including a plurality of holding grooves in which cylindrical cells are disposed; and partition walls that are disposed between holding grooves and between adjacent cylindrical cells. Partition walls are lower than the diameter of cylindrical cells disposed in holding grooves, thermally conductive resin is disposed between adjacent cylindrical cells above partition walls, and thermally conductive resin interconnects adjacent cylindrical cells.

9 Claims, 7 Drawing Sheets

(51) Int. Cl.
*H01M 10/613* (2014.01)
*H01M 10/643* (2014.01)
*H01M 10/653* (2014.01)
*H01M 2/20* (2006.01)
*H01M 2/02* (2006.01)
*H01M 10/0525* (2010.01)

(52) U.S. Cl.
CPC ......... *H01M 2/105* (2013.01); *H01M 2/1077* (2013.01); *H01M 2/202* (2013.01); *H01M 10/0525* (2013.01); *H01M 10/613* (2015.04); *H01M 10/643* (2015.04); *H01M 10/653* (2015.04)

(56) References Cited

U.S. PATENT DOCUMENTS

| | | | |
|---|---|---|---|
| 2006/0286450 A1* | 12/2006 | Yoon | H01M 2/021 429/180 |
| 2011/0090614 A1 | 4/2011 | Guerin et al. | |
| 2013/0004799 A1* | 1/2013 | Bang | H01M 2/1061 429/7 |

FOREIGN PATENT DOCUMENTS

| | | |
|---|---|---|
| JP | 2000-058016 | 2/2000 |
| JP | 2001-313015 | 11/2001 |
| JP | 2005-310449 | 11/2005 |
| JP | 2005310449 A * | 11/2005 |
| JP | 2011-508366 | 3/2011 |
| JP | 2013089560 A * | 5/2013 |
| JP | 2014-086342 | 5/2014 |
| WO | 2009/080936 | 7/2009 |

OTHER PUBLICATIONS

JP 2005-310449A Machine Translation, Retrieved Feb. 28, 2019 (Year: 2005).*
JP-2013089560-A Espacenet Machine Translation (Year: 2013).*
JP-2005310449-A Espacenet Machine Translation (Year: 2005).*
English Translation of Chinese Search Report dated Nov. 12, 2018 in related Chinese Patent Application No. 201580051504.9.
International Search Report of PCT application No. PCT/JP2015/004668 dated Nov. 10, 2015.
Extended European Search Report dated Jul. 3, 2017 in corresponding European patent application No. 15850151.0.

* cited by examiner

BATTERY PACK

This application is a U.S. national stage application of the PCT International Application No. PCT/JP2015/004668 filed on Sep. 14, 2015, which claims the benefit of foreign priority of Japanese patent application 2014-212551 filed on Oct. 17, 2014, the contents all of which are incorporated herein by reference.

TECHNICAL FIELD

The present invention relates to a battery pack that includes a plurality of cylindrical cells and can certainly prevent a thermal runaway of one cylindrical cell from causing a thermal runaway of another cylindrical cell near the one cylindrical cell.

BACKGROUND ART

A secondary cell can exhibit a thermal runaway due to various causes such as an internal short-circuit and an overcharge. For example, when a lithium-ion secondary cell exhibits a thermal runaway, the cell temperature can rapidly increase to 300° C. to 400° C. or more. When any secondary cell exhibits a thermal runaway and causes a thermal runaway of its adjacent secondary cell, disadvantageously, many secondary cells exhibit a thermal runaway and the energy of the thermal runaway extremely increases. This disadvantage can be eliminated by burying all or some of the cylindrical cells in a thermally conductive resin and by absorbing, into the thermally conductive resin, the thermal energy of the cylindrical cell having exhibited the thermal runaway (Patent Literature 1 and Patent Literature 2).

CITATION LIST

Patent Literature

PTL 1: Unexamined Japanese Utility Model Publication No. H06-80260
PTL 2: Unexamined Japanese Patent Publication No. 2014-86342

SUMMARY OF THE INVENTION

In a battery pack of Patent Literature 1, as shown in FIG. 8, thermally conductive resin 87 is filled into exterior case 83, and cylindrical cells 81 are buried in thermally conductive resin 87. In this battery pack, thermally conductive resin 87 can absorb the thermal energy of buried cylindrical cells 81. However, disadvantageously, manufacturing this battery pack takes much time and effort because thermally conductive resin 87 is filled into whole exterior case 83 and cylindrical cells 81 are buried in thermally conductive resin 87. The battery pack is manufactured by disposing cylindrical cells 81 at fixed positions in exterior case 83 and injecting thermally conductive resin 87. However, disadvantageously, it is difficult to completely exhaust the internal air and inject thermally conductive resin 87 without clearance in an injection process. When air remains in exterior case 83 and an air pocket occurs, a thermally coupled state between cylindrical cells 81 and thermally conductive resin 87 degrades, and the thermal energy of cylindrical cells 81 cannot be certainly and stably transferred to thermally conductive resin 87.

A battery pack of Patent Literature 2 is manufactured in the following processes, as shown in an exploded perspective view of FIG. 9:
battery core pack 90 is placed into bottom case 93 in the state where thermally conductive resin 97 is filled into the bottom of bottom case 93;
a lower part of each cylindrical cell 91 is dipped into fluid thermally-conductive resin 97; and
thermally conductive resin 97 is cured in this state.
This battery pack is manufactured by filling the thermally conductive resin into the bottom case through a clearance in the battery core pack in the state where the battery core pack is placed in the bottom case, and curing the thermally conductive resin. In this battery pack, bottom case 93 is molded in a bottomed dish shape that prevents filled thermally conductive resin 97 from leaking to the outside. Regarding this battery pack, in the state where battery core pack 90 is placed in bottom case 93 filled with fluid thermally-conductive resin 97, or in the process of injecting fluid thermally-conductive resin 97 into bottom case 93 having battery core pack 90, fluid thermally-conductive resin 97 is apt to leak to the outside, and bottom case 93 must be left at rest until fluid thermally-conductive resin 97 is cured. Therefore, disadvantageously, the workability is low and efficient mass production is difficult.

The present invention has been developed for addressing this disadvantage. An important objective of the present invention is to provide a battery pack that allows efficient mass production while effectively preventing the induction of a thermal runaway of a cylindrical cell.

A battery pack of the present invention includes: a plurality of chargeable/dischargeable cylindrical cells; a battery holder for storing the plurality of cylindrical cells disposed on the same horizontal plane; and a thermally conductive resin that closely adheres to the cylindrical cells, which are stored in the battery holder, in a thermally coupled state above the battery holder. The battery holder includes: a bottom plate having a plurality of holding grooves in which the cylindrical cells are disposed; and partition walls disposed between holding grooves and between adjacent cylindrical cells. The partition walls are lower than the diameter of the cylindrical cells disposed in the holding grooves. The thermally conductive resin is disposed between the adjacent cylindrical cells above the partition walls, and interconnects the adjacent cylindrical cells in a thermally coupled state.

A battery pack of the present invention allows efficient mass production while securing the safety by effectively preventing the induction of a thermal runaway of a cylindrical cell. That is because the battery pack of the present invention has the following structure: a thermally conductive resin is applied to the valleys between the cylindrical cells arranged in parallel in a battery holder having an upper opening; and the applied thermally conductive resin interconnects the adjacent cylindrical cells in a thermally coupled state and prevents the induction of a thermal runaway. Especially, in the battery pack of the present invention, the upper part of the battery holder is open, and the thermally conductive resin is applied, through the opening, to the valleys between the adjacent cylindrical cells. Therefore, the thermally conductive resin can be easily applied, and can be applied in the state where the thermally conductive resin certainly and closely adheres to the surfaces of the cylindrical cells, namely in an ideal thermally-coupled state. The thermally conductive resin applied in this state efficiently absorbs the thermal energy of a cylindrical cell having exhibited a thermal runaway, and radiates, via the thermally conductive resin, the absorbed thermal energy to another cylindrical cell that is connected to the former cylindrical cell in the thermally coupled state.

DESCRIPTION OF EMBODIMENT(S)

Figure 1:
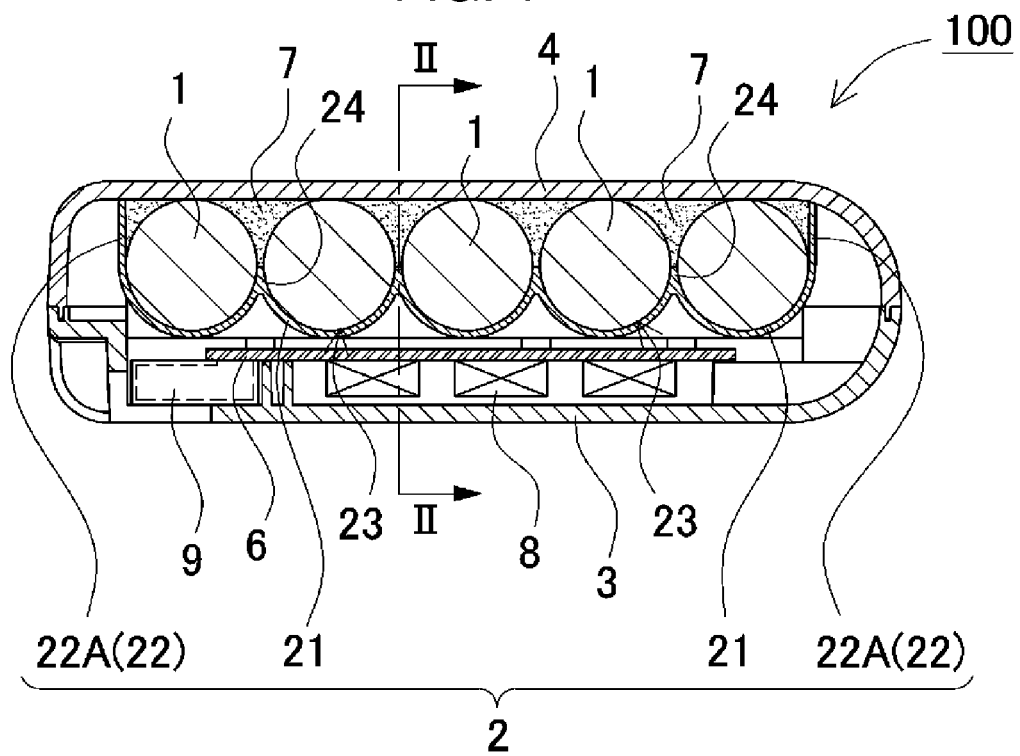
FIG. 1 is a vertical sectional view of a battery pack in accordance with one example of the present invention.

Hereinafter, examples of the present invention are described with reference to the accompanying drawings. The following examples show battery packs for embodying the technical ideas of the present invention. The present invention is not limited to the following battery packs. In this description, members shown in the scope of claims are not limited to the members of the examples.

Each of battery packs 100 and 200 shown in FIG. 1 to FIG. 5 includes the following components:

a plurality of chargeable/dischargeable cylindrical cells 1;

battery holder 2 for guiding the plurality cylindrical cells 1 and arranging them in parallel on the same horizontal plane;

thermally conductive resin 7 closely adhering, in a thermally coupled state, to exposed surfaces 1A of cylindrical cells 1 stored in battery holder 2; and bottom case 3 in which battery holder 2 is disposed.

The battery pack of the present example has an abovementioned structure, and can further include holding grooves each having a shape following the surface of each cylindrical cell.

In the battery pack of the present example, the height of each partition wall from the bottom plate can be set at ¼ or more and ¾ or less of the diameter of each cylindrical cell.

In the battery pack of the present example, a peripheral wall having a height equivalent to the diameter of each cylindrical cell can be erected around the bottom plate.

In the battery pack of the present example, a lead plate connected to an electrode of each cylindrical cell is disposed in an electrode window opened in the peripheral wall, and can block the electrode window.

The battery pack of the present example includes a bottom case having an upper opening in which a battery holder is disposed, and a circuit board that is disposed between the battery holder and the bottom case and has a protective circuit of the cylindrical cells.

In the battery pack of the present example, the thermally conductive resin can take a non-fluid paste form in an uncured state.

In the battery pack of the present example, the thermally conductive resin can include any one of a silicon resin, an urethane resin, and an epoxy resin.

The battery pack of the present example includes a lid case that covers the upper opening of the battery holder and is connected to the bottom case. The lid case is made to closely adhere to the thermally conductive resin in the thermally coupled state and can block the upper openings of both of the battery holder and the bottom case.

In the battery pack of the present example, the thermally conductive resin includes a low-temperature molding resin made of a thermoplastic resin whose melting temperature is 120° C. or more and 250° C. or less. The battery holder in which the cylindrical cells are disposed at fixed positions is insert-molded in the low-temperature molding resin and is fixed to a fixed position, the low-temperature molding resin is made to closely adhere to cylindrical cells 1 in the thermally coupled state, and the thermally conductive resin serves as a lid case for blocking the upper opening of the bottom case.

In the battery pack of the present example, battery holders are stacked in a plurality of stages, and the thermally conductive resin filled into the battery holders can be formed so that an upper battery holder and lower battery holder 2 closely adhere to each other in the thermally coupled state.

Therefore, the battery pack of the present example can prevent the induction of a thermal runaway by restricting the temperature increase of the cylindrical cells that is caused by the thermal energy of a cylindrical cell having exhibited a thermal runaway. Furthermore, partition walls are disposed between the cylindrical cells, so that the partition walls also absorb the thermal energy of the cylindrical cell having exhibited a thermal runaway via the thermally conductive resin applied to the valleys. The thermal energy absorbed by the partition walls is thermally transferred to the bottom plate of the battery holder and is radiated, so that rapid temperature increase of the partition walls is also suppressed. Therefore, in the battery pack, the thermally conductive resin can be easily and certainly applied in an ideal thermally-coupled state, and a combination of the applied thermally conductive resin and the partition walls can certainly prevent the induction of a thermal runaway of a cylindrical cell.

The battery pack of the present example allows an efficient and inexpensive mass production while securing the safety by effectively preventing the induction of a thermal runaway of a cylindrical cell. That is because the battery pack of the present invention includes the following structure: a thermally conductive resin includes a low-temperature molding resin made of a thermoplastic resin; the battery holder in which the cylindrical cells are disposed at fixed positions is insert-molded in the low-temperature molding resin and is fixed to a fixed position; the low-temperature molding resin is made to closely adhere to the cylindrical cells in the thermally coupled state; and the thermally conductive resin is used also as a lid case for blocking the upper opening in the bottom case. In the battery pack of the present example, especially, the battery holder in which the cylindrical cells are disposed at the fixed positions is insert-molded in the thermally conductive resin of the low-temperature molding resin, so that the thermally conductive resin can be certainly made to closely adhere to the surfaces of the cylindrical cells and can be disposed in the ideal thermally-coupled state. The thermally conductive resin in this state efficiently absorbs the thermal energy of a cylindrical cell having exhibited a thermal runaway, and radiates, via the thermally conductive resin, the absorbed thermal energy to another cylindrical cell that is connected to the former cylindrical cell in the thermally coupled state.

In the battery pack of the present example, a thermally conductive resin includes a low-temperature molding resin, and the low-temperature molding resin is used also as a lid case for blocking the upper opening in the bottom case. Therefore, it is not required to use a lid case made of another member in order to block the upper opening in the bottom case, and to connect the lid case to the bottom case. Therefore, extremely efficient and inexpensive mass production is allowed. The lid case does not need to be used, so that the whole battery pack can be thinned. Furthermore, the surface of the thermally conductive resin is exposed to the outside, so that the heat is efficiently radiated from the surface of the thermally conductive resin, the temperature increase of the thermally conductive resin can be reduced, and the induction of a thermal runaway of a cylindrical cell can be more effectively prevented.

Cylindrical cell 1 is a lithium-ion secondary cell. As the cylindrical cell, a chargeable/dischargeable secondary cell such as a nickel-cadmium cell or nickel-metal-hydride battery, especially a cell that generates heat of a high temperature in the use state, can be used.

Figure 3:
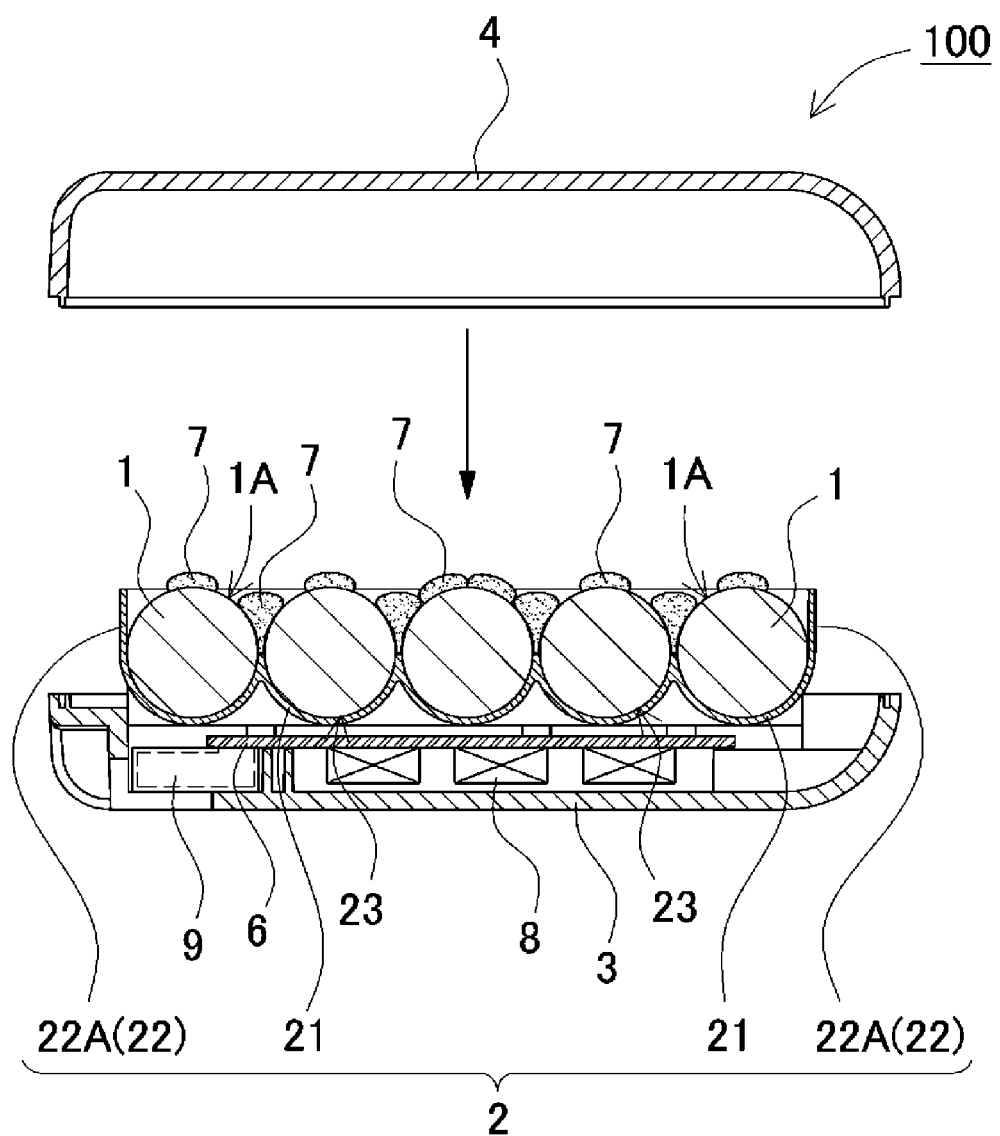
FIG. 3 is an exploded sectional view showing the manufacturing process of the battery pack of FIG. 1.
Figure 4:
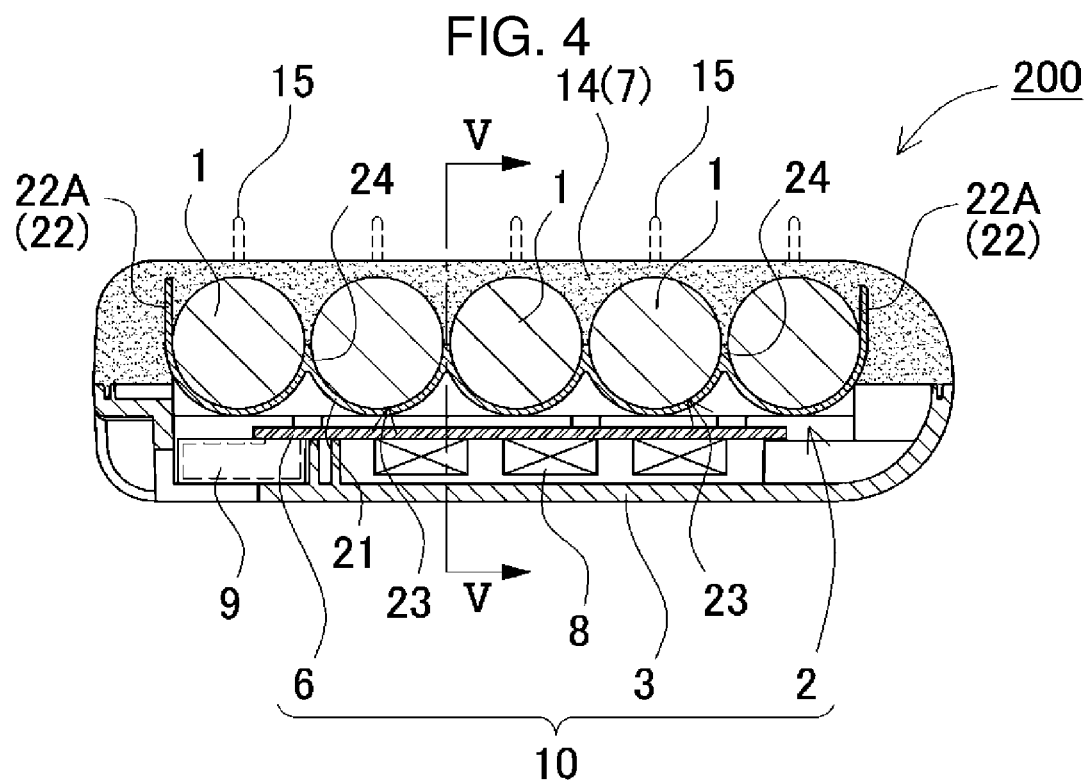
FIG. 4 is a vertical sectional view of a battery pack in accordance with another example of the present invention.

Battery holder 2 is entirely made of plastic as an insulating material, and is formed in a box shape having an upper opening by disposing peripheral wall 22 around bottom plate 21 perpendicularly to bottom plate 21. Bottom plate 21 includes a plurality of holding grooves 23 for guiding cylindrical cells 1 and holding them at fixed positions on the same horizontal plane. Bottom plate 21 includes holding grooves 23 each having a shape following the surface of each cylindrical cell 1, and is molded in a wave shape. Bottom plate 21 closely adheres to the lower surfaces of cylindrical cells 1, and cylindrical cells 1 are disposed in a thermally coupled state. Each holding groove 23 of bottom plate 21 has a width of ½ or less and more than ¼ of the whole circumference of each cylindrical cell 1, and is molded in the shape following the surface of each cylindrical cell 1. Wave-shaped bottom plate 21 includes, between holding grooves 23, partition walls 24 to be disposed between adjacent cylindrical cells 1. Partition walls 24 are lower than the diameter of cylindrical cells 1 disposed in holding grooves 23, and, ideally, are molded at a height of about a half of the diameter of cylindrical cells 1, as shown in FIG. 1, FIG. 3, and FIG. 4. Although not shown, the height of each partition wall 24 from bottom plate 21 can be set at ¼ or more and ¾ or less of the diameter of cylindrical cells 1.

In battery holder 2, the height of peripheral wall 22 is set substantially the same as the diameter of cylindrical cells 1. In other words, the upper end of peripheral wall 22 and the upper ends of cylindrical cells 1 are arranged on the same plane, and cylindrical cells 1 are disposed inside peripheral wall 22. In the battery holder, the peripheral wall can be made lower than the upper surfaces of the cylindrical cells. Especially, in an applied and uncured state, thermally conductive resin 7 taking a non-fluid paste form does not flow down when it is applied to the valleys and the upper surfaces of cylindrical cells 1. Therefore, even when peripheral wall 22 is made low, applied thermally conductive resin 7 does not flow down to the outside of battery holder 2.

The sectional views of FIG. 1 and FIG. 4 are sectional views obtained by cutting battery packs 100 and 200 orthogonally to the longitudinal direction of cylindrical cells 1. Battery holder 2 shown in these diagrams has a curved shape following the outer surfaces of cylindrical cells 1 in the range including bottom plate 21 and side walls 22A of peripheral wall 22. Here, side walls 22A are disposed on the opposite sides of whole cylindrical cells 1. In battery holder 2, cylindrical cells 1 on the opposite sides can be placed in holding grooves 23 in bottom plate 21 and can be disposed so as to prevent a positional displacement. That is because cylindrical cells 1 can be disposed at fixed positions via holding grooves 23 and side walls 22A on the opposite sides.

Figure 2:
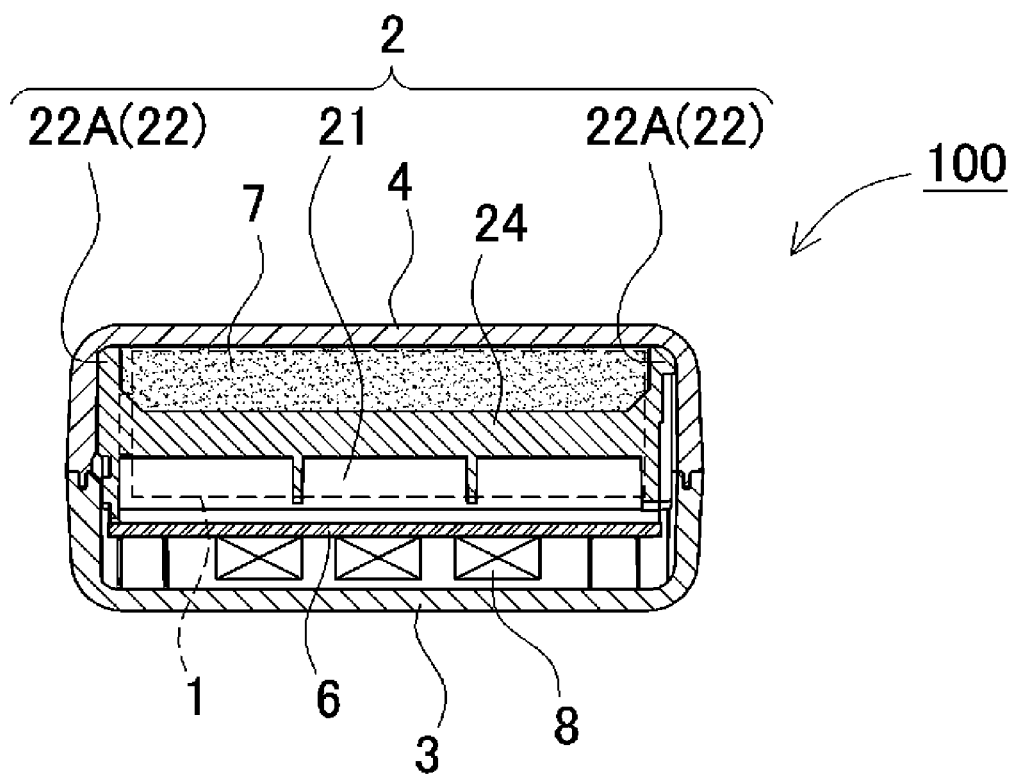
FIG. 2 is a sectional view taken along line II-II on the battery pack of FIG. 1.
Figure 5:
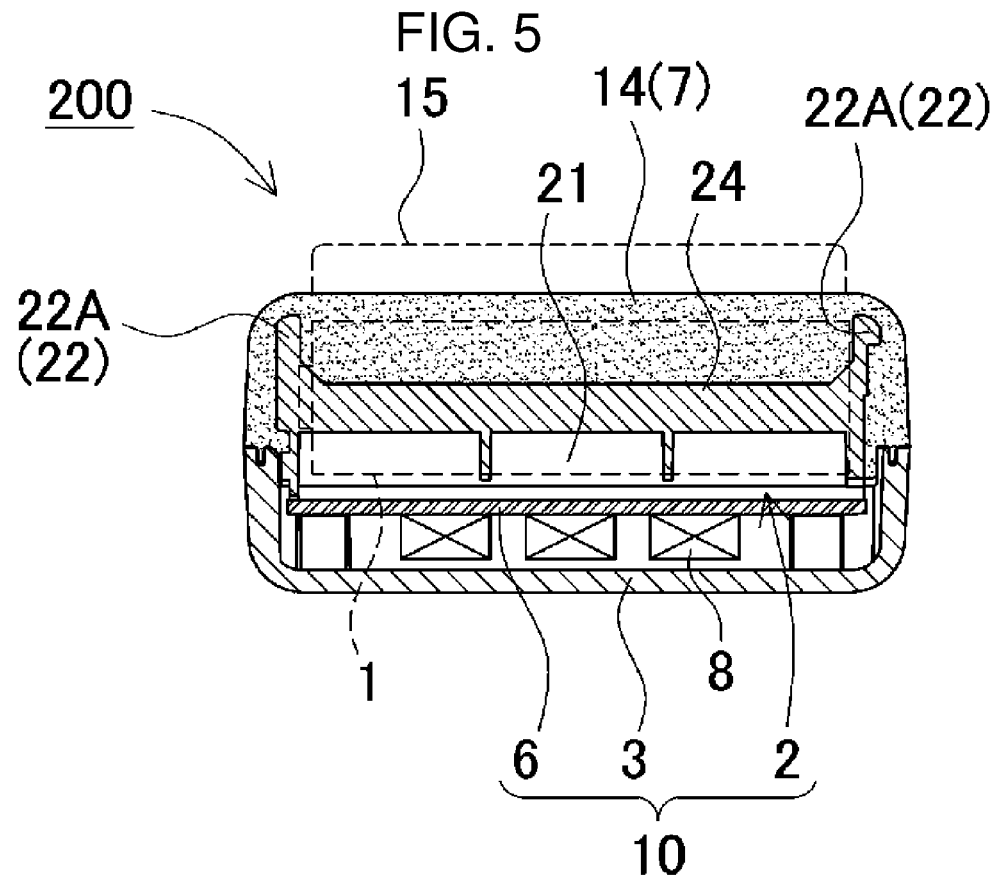
FIG. 5 is a sectional view taken along line V-V on the battery pack of FIG. 4.
Figure 6:
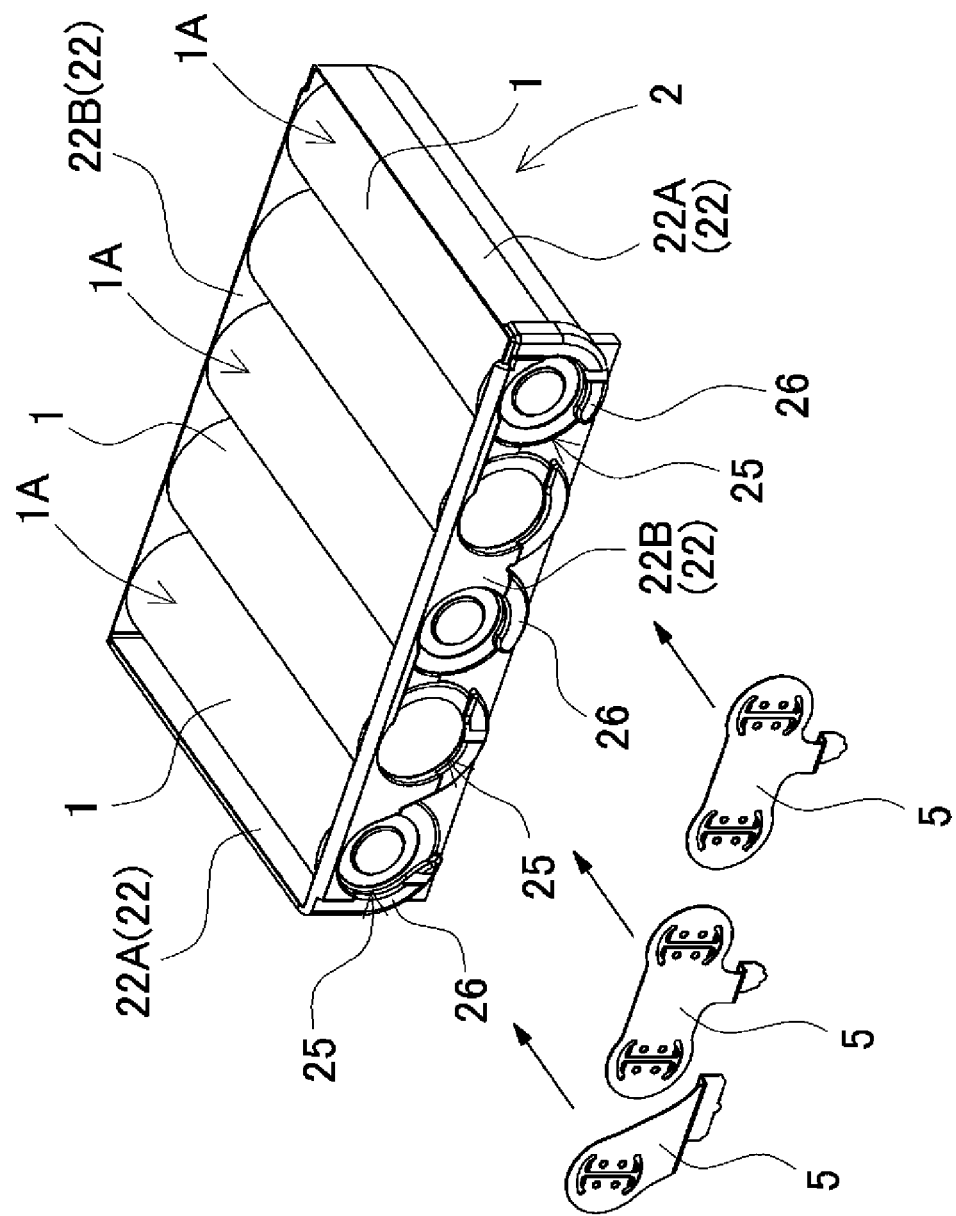
FIG. 6 is an exploded perspective view showing the connection structure between lead plates and cylindrical cells stored in a battery holder.

The sectional views of FIG. 2 and FIG. 5 are sectional views obtained by cutting battery packs 100 and 200 along the longitudinal direction of cylindrical cells 1. These diagrams show the cross sections obtained by cutting the battery packs at the positions of the valleys between adjacent cylindrical cells 1. In battery holder 2 disposed in bottom case 3, as shown in FIG. 6, each of end-surface walls 22B of peripheral wall 22 includes opening electrode windows 25 in which metal lead plates 5 are disposed. Here, end-surface walls 22B are disposed on the opposite ends of cylindrical cells 1. Lead plate 5 is connected to the end electrodes of adjacent cylindrical cells 1, and cylindrical cells 1 are interconnected in series or in parallel. Lead plate 5 is fixed to the end electrodes of cylindrical cells 1 by spot welding. Electrode windows 25 are disposed at positions facing the end electrodes disposed at the opposite ends of each cylindrical cell 1, and expose the end electrodes to the outside of end-surface walls 22B. Each electrode window 25 is blocked by lead plate 5 connected to the end electrode of cylindrical cell 1. In battery holder 2 in which electrode windows 25 are blocked by lead plates 5, even when thermally conductive resin 7 of a low viscosity is applied, thermally conductive resin 7 can be prevented from leaking to the outside of peripheral wall 22.

In battery holder 2 shown in FIG. 6, lead plates 5 are disposed on end-surface walls 22B in an engagement structure. Each end-surface wall 22B includes, on the outside, positioning engagement portions 26 used for disposing lead plates 5 at fixed positions in the engagement structure. Each positioning engagement portion 26 is smaller than the outer shape of each cylindrical cell 1, and opening electrode windows 25 are disposed inside positioning engagement portion 26. Lead plates 5 are fitted into the inside of positioning engagement portions 26, and are disposed at fixed positions of each end-surface wall 22B. The projecting electrode and flat electrode that are disposed at the opposite ends of each cylindrical cell 1 are disposed inside end-surface walls 22B, and are disposed in the state where they are exposed to the outside through electrode windows 25. The projecting electrode and flat electrode that are exposed through electrode windows 25 come into contact with lead plates 5 disposed in electrode windows 25, and are fixed by spot welding. In battery holder 2 of the present invention, electrode windows 25 can be certainly blocked by lead plates 5 disposed in positioning engagement portions 26.

Bottom case 3 has a box shape having an upper opening, and battery holder 2 is disposed at a fixed position inside it. Battery holder 2 is disposed at the fixed position in an engagement structure in bottom case 3. The engagement structure between bottom case 3 and battery holder 2 can include a structure in which one of battery holder 2 and bottom case 3 has a fitting projection and the other has a fitting recess. In this engagement structure, by guiding the fitting projection to the fitting recess, battery holder 2 and bottom case 3 can be disposed at fixed positions. The following structure may be employed: bottom case 3 includes a positioning recess for guiding battery holder 2 to the fixed position; battery holder 2 is guided to the positioning recess disposed in bottom case 3; and battery holder 2 is disposed at the fixed position in bottom case 3.

In battery packs 100 and 200 in which battery holder 2 and bottom case 3 are connected to the fixed positions in the engagement structure, battery holder 2 can be easily disposed at the fixed position in bottom case 3. However, battery holder 2 does not necessarily need to be disposed at the fixed position in bottom case 3 in the engagement structure. The reasons are as follows. In battery pack 100 shown in FIG. 1 and FIG. 2, thermally conductive resin 7 is made to adhere to lid case 4, and battery holder 2 can be disposed at the fixed position. In battery pack 200 shown in FIG. 4 and FIG. 5, battery holder 2 can be insert-molded in thermally conductive resin 7 of low-temperature molding resin, and can be fixed to the fixed position.

Circuit board 6 is disposed between battery holder 2 and bottom case 3. Circuit board 6 includes electronic component 8 such as a protective circuit. For example, the protective circuit of circuit board 6 includes: a detection circuit for detecting the voltage, remaining capacity, and temperature of each cylindrical cell 1; and a switching element that is turned on or off in response to the cell data detected by the detection circuit. When the voltage, remaining capacity, or temperature of cylindrical cell 1 exceeds a set range, the protective circuit turns off the switching element to block the current and protects cylindrical cell 1. Circuit board 6 is connected to cylindrical cells 1 via single-wire lead lines or lead plate 5, and disposed at a fixed position of battery holder 2. Circuit board 6 can be disposed at the fixed position also by the following processes: forming, in the lower surface of battery holder 2, a fitting recess into which circuit board 6 is fitted or a positioning projection for positioning circuit board 6; and engaging circuit board 6 with the fitting recess or positioning projection.

Thermally conductive resin 7 is a silicon resin taking a paste form in an uncured state. Thermally conductive resin 7, however, may include an urethane resin or an epoxy resin that is a resin taking a paste form in an uncured state. The thermal conductivity of thermally conductive resin 7 can be increased by mixing a thermally conductive material into it. As the thermally conductive material, metal powder, carbon powder, or carbon fiber can be employed. Preferably, an insulating material is employed as thermally conductive resin 7. When electrically-conductive metal powder is employed as the mixed thermally conductive material, the electric conductivity of thermally conductive resin 7 can be decreased by reducing the additive amount. That is because an insulating resin is disposed around the thermally conductive material and the thermally conductive material is buried in a state insulated by the insulating resin. The heat capacity of thermally conductive resin 7 per unit volume can be increased by mixing, into it, powder of a high heat capacity—for example, inorganic powder. Thermally conductive resin 7 having a high heat capacity can absorb much thermal energy from cylindrical cells 1, so that the induction of a thermal runaway can be more effectively prevented.

FIG. 3 is an exploded sectional view showing the manufacturing process of battery pack 100 of FIG. 1. In this process, thermally conductive resin 7 is applied to cylindrical cells 1. As shown in FIG. 3, thermally conductive resin 7 is applied to the valleys between cylindrical cells 1 and interconnects adjacent cylindrical cells 1 in a thermally-coupled state. Therefore, employed thermally conductive resin 7 has a viscosity allowing the following process: thermally conductive resin 7 remains in the valleys between cylindrical cells 1 in the applied and uncured state, and can interconnect adjacent cylindrical cells 1 in a thermally-coupled state. Thermally conductive resin 7 taking a non-fluid paste form in the applied and uncured state does not flow down when it is applied to the valleys between cylindrical cells 1, remains and is cured in the valleys, and can interconnect adjacent cylindrical cells 1 in an ideal thermally-coupled state. Thermally conductive resin 7 can be very easily applied and is cured in the applied state, and hence can certainly interconnect adjacent cylindrical cells 1 in the thermally-coupled state. Applied thermally conductive resin 7 does not flow or move before it is cured, so that the handling in a period from the application to the cure is simple and efficient mass production is allowed.

However, the battery pack of the present invention is not limited to thermally conductive resin 7 taking a non-fluid paste form in the uncured state. The reason is as follows. A battery pack including battery holder 2 in which applied thermally conductive resin 7 as an uncured resin is prevented from leaking from the inside of peripheral wall 22 can also employ thermally conductive resin 7 having a viscosity that allows flow down of the resin from the valleys to the gaps between bottom plate 21 and cylindrical cells 1. In this battery pack, thermally conductive resin 7 applied to the valleys between cylindrical cells 1 does not leak from the inside of battery holder 2 to the outside, so that thermally conductive resin 7 is filled into the valleys between cylindrical cells 1 through the gaps between bottom plate 21 and cylindrical cells 1.

In battery pack 100 of FIG. 3, thermally conductive resin 7 is applied to not only the valleys between cylindrical cells 1 but also the tops of cylindrical cells 1. In battery pack 100 of FIG. 3, thermally conductive resin 7 is applied in two rows to the top of central cylindrical cell 1, and is applied in one row to the tops of other cylindrical cells 1. In battery pack 100, thermally conductive resin 7 is applied to the valleys and to the tops of cylindrical cells 1, and then thermally conductive resin 7 connects lid case 4 to bottom case 3 in the uncured state. Thermally conductive resin 7 taking a paste form in the uncured state is flattened and made to closely adhere to the inner surface of lid case 4. In battery pack 100, thermally conductive resin 7 applied to the valleys interconnects adjacent cylindrical cells 1 in the thermally coupled state, and thermally conductive resin 7 applied to the tops connects cylindrical cells 1 to lid case 4 in the thermally coupled state. Therefore, the thermal energy of cylindrical cell 1 that generates heat is transferred to and absorbed by thermally conductive resin 7 and its adjacent cylindrical cells 1, and also is absorbed by lid case 4 and radiated to the outside. In battery pack 100, therefore, the thermal energy of cylindrical cell 1 having exhibited a thermal runaway is efficiently absorbed by thermally conductive resin 7 and other cylindrical cells 1, the heat is effectively radiated from lid case 4, and the induction of a thermal runaway can be more certainly prevented.

In battery pack 100 of FIG. 1 to FIG. 3, the end surfaces of the peripheral walls disposed in lid case 4 and bottom case 3 are ultrasonically welded to each other, or are adhesively interconnected. One of the end surfaces of lid case 4 and bottom case 3 includes a ridge, and the other includes a connection groove for guiding the ridge. Lid case 4 and bottom case 3 are connected to fixed positions by inserting the ridge into the connection groove. Although not shown, lid case 4 and bottom case 3 may be interconnected by screwing a locking screw through one case into a boss disposed in the other case. The end surfaces of the peripheral walls of lid case 4 and bottom case 3 are interconnected, and the inside of these cases is blocked. Furthermore, output connecter 9 connected to circuit board 6 is fixed to bottom case 3. Output connecter 9 has an output terminal and a signal terminal, is charged or discharged via the output terminal, and communicates with an installed apparatus via the signal terminal. However, the battery pack may have the following structure: an output connecter is not disposed; connection terminals formed of the output terminal and signal terminal are fixed to the circuit board; and these connection terminals are pulled out of the bottom case and connected to the outside.

In battery pack 200 of FIG. 4 and FIG. 5, thermally conductive resin 7 includes a low-temperature molding resin made of a thermoplastic resin whose melting temperature is 120° C. or more and 250° C. or less. Battery pack 200 is molded by the following processes: disposing cylindrical cells 1 at fixed positions of battery holder 2; temporarily fixing core pack 10 that is produced by integrally interconnecting circuit board 6, bottom case 3, and battery holder 2 to a fixed position of a die for molding the low-temperature molding resin; heating a molding chamber of the die; and injecting molten thermally conductive resin 7. After thermally conductive resin 7 is cooled, thermally conductive resin 7 is taken out of the die, and thus battery pack 200 in which core pack 10 of the battery is insert-molded in thermally conductive resin 7 is produced. Battery pack 200 is produced by insert-molding core pack 10 of the battery in thermally conductive resin 7 of the low-temperature molding resin. Thermally conductive resin 7 closely adheres to the surfaces of cylindrical cells 1 that are exposed to the upper opening of battery holder 2, and interconnects all cylindrical cells 1 in the thermally coupled state.

In battery pack 200 of FIG. 4 and FIG. 5, molded thermally conductive resin 7 is used also as lid case 14. Therefore, battery pack 200 does not require a lid case as another member, and does not require a process of connecting another molded lid case to bottom case 3. Therefore, the component cost can be reduced, the manufacturing process can be simplified, and the manufacturing cost can be reduced. Since thermally conductive resin 7 is exposed to the outside and the heat is radiated, the heat radiation characteristic of thermally conductive resin 7 can be improved. Furthermore, the heat radiation characteristic can be improved, by disposing radiation fins 15 on thermally conductive resin 7 as shown by dashed lines in the drawings.

Cylindrical cells 1 that are insert-molded in the low-temperature molding resin as thermally conductive resin 7 closely adhere to thermally conductive resin 7, and adjacent cylindrical cells 1 are interconnected in the thermally coupled state. The thermoplastic resin of the low-temperature molding resin is a polyamide resin. Another resin such as an epoxy resin can be added to the polyamide resin. A polyamide resin containing an added epoxy resin has an adhesive force to cylindrical cells 1 higher than that of only a polyamide resin.

A polyamide resin has a low softening temperature, and also has a low viscosity during melting, so that it can be molded at a lower temperature and a lower pressure compared with another thermoplastic synthetic resin. In addition, a polyamide resin can be taken out of the molding chamber of the die. The low-temperature molding resin molded at a low temperature and a low pressure can shorten the time taken for molding, and can reduce the adverse effect of the heat and injection pressure during the resin molding on an electronic component or the like. In the present invention, however, the low-temperature molding resin is not limited to the polyamide resin. A resin other than the polyamide resin—for example, polyurethane resin—can be employed. Furthermore, as the low-temperature molding resin, a thermoplastic resin such as a polyethylene resin, acrylic resin, and polypropylene resin can be employed, as long as the thermoplastic resin can improve the heat resistance of cylindrical cells 1 and electronic component 8 that are insert-molded.

Figure 7:
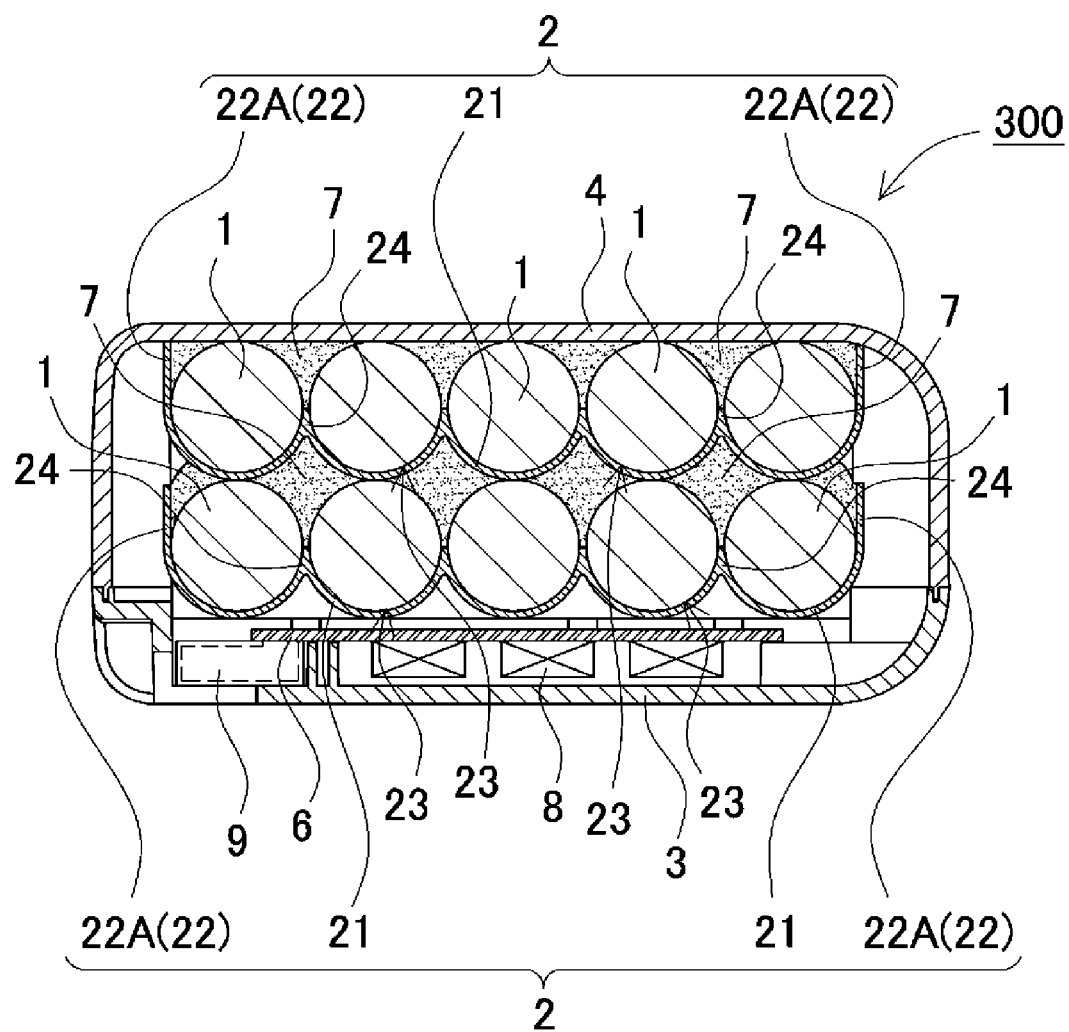
FIG. 7 is a vertical sectional view of a battery pack in accordance with yet another example of the present invention.
Figure 8:
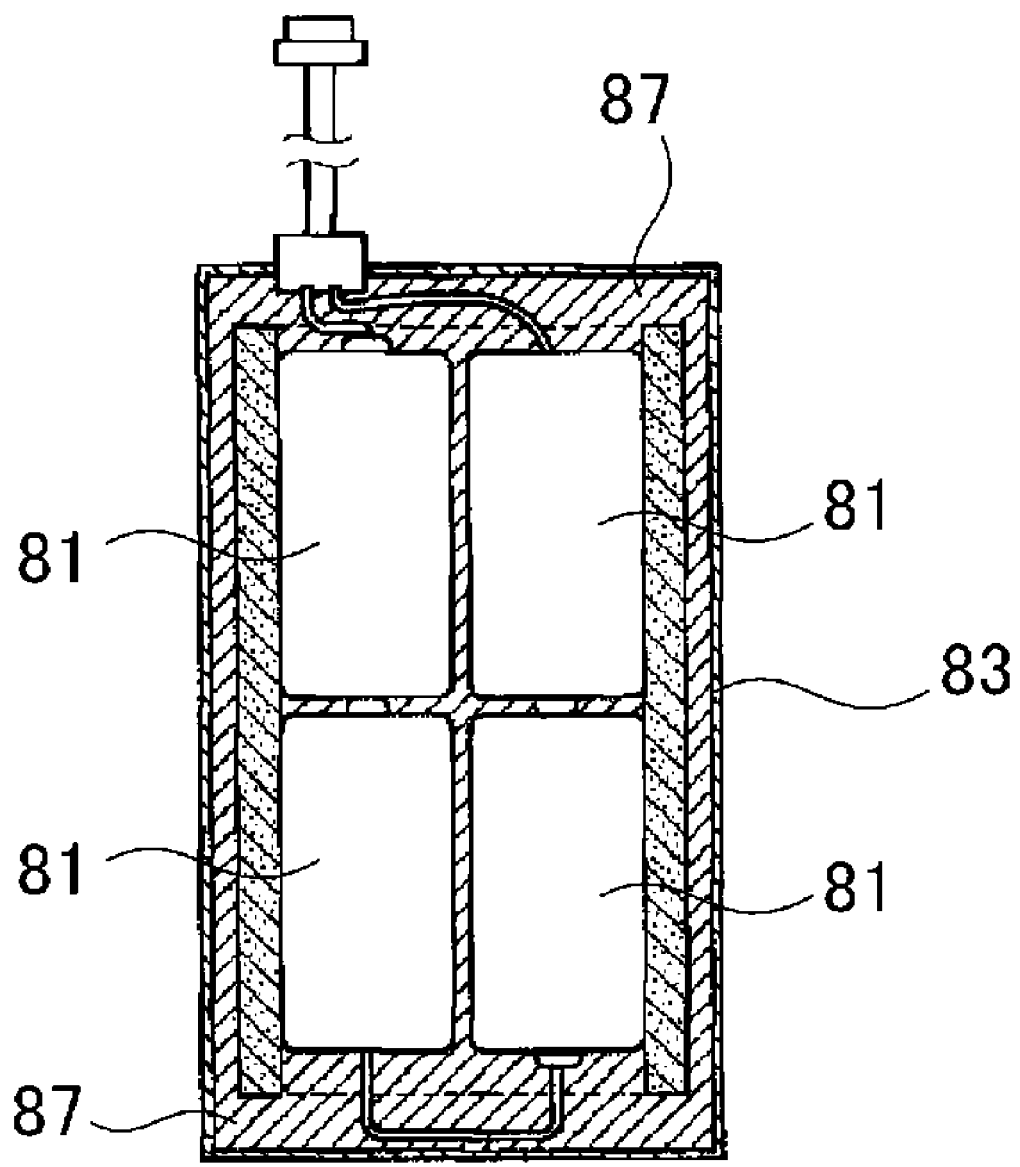
FIG. 8 is a sectional view of a conventional battery pack.
Figure 9:
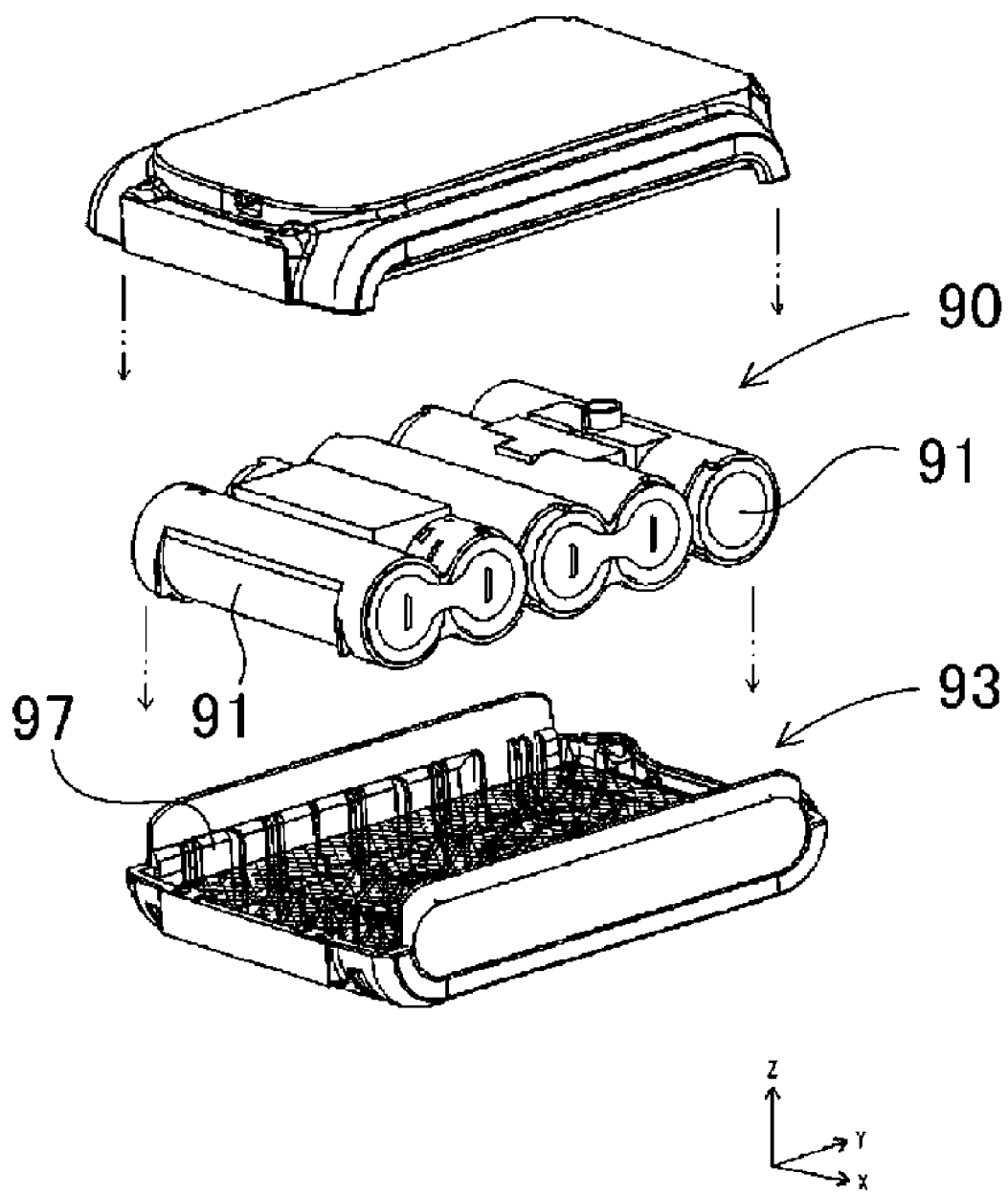
FIG. 9 is an exploded perspective view of another conventional battery pack.

In the present exemplary embodiment, a plurality of cylindrical cells 1 are disposed on the same plane using one battery holder 2. As battery pack 300 of FIG. 7, however, another battery holder 2 including a plurality of cylindrical cells 1 disposed on the same plane may be stacked on one battery holder 2 in two stages. Battery holders 2 may be stacked in three or more stages. In other words, battery holders 2 may be stacked in a plurality of stages. At this time, thermally conductive resin 7 filled into lower battery holder 2 can make upper battery holder 2 closely adhere to lower battery holder 2 in the thermally coupled state. Thus, the battery capacity can be increased solely by increasing the volume corresponding to the thickness of battery holder 2. As battery pack 200 of FIG. 4, molded thermally conductive resin 7 may be used also as lid case 14.

In the present exemplary embodiment, partition walls 24 are used as curved coupling portions by forming bottom plate 21 in a curved shape following the outer surfaces of cylindrical cells 1. However, the bottom plate may be made flat, and partition walls may be vertically erected from the flat plate.

A battery pack of the present invention includes a plurality of cylindrical cells, and can be safely used by preventing the induction of a thermal runaway of a cylindrical cell.

The invention claimed is:

1. A battery pack comprising:
   a plurality of chargeable/dischargeable cylindrical cells;
   a battery holder for storing the plurality of cylindrical cells disposed on the same horizontal plane; and
   a thermally conductive resin closely adhering to the plurality of cylindrical cells in a thermally coupled state above the battery holder, the plurality of cylindrical cells being stored in the battery holder,
   wherein the battery holder includes:
      a bottom plate having a plurality of holding grooves in which the plurality of cylindrical cells are disposed; and
      partition walls disposed between the plurality of holding grooves and between adjacent cylindrical cells, of the plurality of cylindrical cells,
   wherein a height of each of the partition walls is lower than a diameter of each of the plurality of cylindrical cells disposed in the plurality of holding grooves, and
   wherein the thermally conductive resin is disposed between the adjacent cylindrical cells above the partition walls, and interconnects the adjacent cylindrical cells,
   wherein each of the plurality of holding grooves is formed in a shape following a surface of each of the plurality of cylindrical cells,
   wherein the thermally conductive resin makes an upper battery holder, a lower battery holder, and the partition walls of the lower battery holder,
   wherein each of the battery holders closely adhere to each other in a thermally coupled state and are stacked in a plurality of stages,
   wherein each of the battery holders store the plurality of cylindrical cells,
   wherein the thermally conductive resin is disposed between the adjacent cylindrical cells above the partition walls, and interconnects the adjacent cylindrical cells,
   and wherein the thermally conductive resin is disposed between the upper battery holder and the lower battery holder.

2. The battery pack according to claim 1, wherein the height of each of the partition walls from the bottom plate is ¼ or more and ¾ or less of the diameter of each of the plurality of cylindrical cells.

3. The battery pack according to claim 1, wherein a peripheral wall having a height equivalent to the diameter of each of the plurality of cylindrical cells is erected around the bottom plate.

4. The battery pack according to claim 3, wherein a lead plate coupled to an electrode of each of the plurality of cylindrical cells is disposed in an electrode window opened in the peripheral wall, and blocks the electrode window.

5. The battery pack according to claim 1, further comprising:
   a bottom case having an upper opening, the battery holder being disposed in the bottom case; and
   a circuit board disposed between the battery holder and the bottom case, and having a protective circuit of the plurality of cylindrical cells.

6. The battery pack according to claim 1, wherein the thermally conductive resin takes a non-fluid paste form in an uncured state.

7. The battery pack according to claim 1, wherein the thermally conductive resin includes any one of a silicon resin, an urethane resin, and an epoxy resin.

8. The battery pack according to claim 5, further comprising a lid case covering an upper opening of the battery holder and coupled to the bottom case, wherein the lid case is made to closely adhere to the thermally conductive resin in a thermally coupled state, and blocks the upper opening of the bottom case.

9. The battery pack according to claim 5, wherein:
   the thermally conductive resin includes a low-temperature molding resin made of a thermoplastic resin whose melting temperature is 120° C. or more and 250° C. or less,
   the battery holder storing the plurality of cylindrical cells disposed at fixed positions is insert-molded in the low-temperature molding resin and is fixed to a fixed position,
   the low-temperature molding resin is made to closely adhere to the plurality of cylindrical cells in a thermally coupled state, and
   the thermally conductive resin serves as a lid case for blocking the upper opening of the bottom case.

* * * * *